United States Patent
Rayaprolu et al.

(10) Patent No.: US 12,007,838 B2
(45) Date of Patent: Jun. 11, 2024

(54) ACCESSING DATA USING ERROR CORRECTION OPERATION(S) TO REDUCE LATENCY AT A MEMORY SUB-SYSTEM

(71) Applicant: MICRON TECHNOLOGY, INC., Boise, ID (US)

(72) Inventors: Vamsi Pavan Rayaprolu, Santa Clara, CA (US); Dung Viet Nguyen, San Jose, CA (US); Zixiang Loh, Folsom, CA (US); Sampath K Ratnam, San Jose, CA (US); Patrick R. Khayat, San Diego, CA (US); Thomas Herbert Lentz, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/877,637

(22) Filed: Jul. 29, 2022

(65) Prior Publication Data
US 2024/0036973 A1    Feb. 1, 2024

(51) Int. Cl.
*G06F 11/00* (2006.01)
*G06F 11/10* (2006.01)

(52) U.S. Cl.
CPC .............. *G06F 11/1044* (2013.01)

(58) Field of Classification Search
CPC .................................. G06F 11/1044
See application file for complete search history.

(56) References Cited

U.S. PATENT DOCUMENTS

| | | | |
|---|---|---|---|
| 7,522,369 B1* | 4/2009 | Rahgozar | G11B 5/607 360/75 |
| 9,799,090 B2* | 10/2017 | Asai | G09G 5/003 |
| 9,928,126 B1* | 3/2018 | Shappir | G11C 11/5642 |
| 11,163,488 B2* | 11/2021 | Rayaprolu | G06F 3/0647 |
| 11,210,031 B1* | 12/2021 | Mekhanik | G06F 3/0679 |
| 11,461,167 B2* | 10/2022 | Lee | G06F 11/1048 |
| 11,662,941 B2* | 5/2023 | Solanki | G06F 3/0655 711/154 |
| 2019/0267054 A1* | 8/2019 | Thalaimalaivanaraj | G06F 11/1048 |
| 2021/0050054 A1* | 2/2021 | Ray | G11C 16/26 |
| 2023/0068702 A1* | 3/2023 | Muchherla | G11C 29/028 |

* cited by examiner

*Primary Examiner* — Amine Riad
(74) *Attorney, Agent, or Firm* — LOWENSTEIN SANDLER LLP (57) ABSTRACT

A request to access data programmed to a memory sub-system is received. A determination is made of whether memory cells of the memory sub-system that store the programmed data satisfy one or more cell degradation criteria. In response to a determination that the memory cells satisfy the one or more cell degradation criteria, an error correction operation to access the data is performed in accordance with the request.

19 Claims, 6 Drawing Sheets

ACCESSING DATA USING ERROR CORRECTION OPERATION(S) TO REDUCE LATENCY AT A MEMORY SUB-SYSTEM

TECHNICAL FIELD

Embodiments of the disclosure relate generally to memory sub-systems, and more specifically, relate to accessing data using error correction operation(s) to reduce latency at a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to accessing data using error correction operation(s) to reduce latency at a memory sub-system. A memory sub-system can be a storage device, a memory module, or a combination of a storage device and memory module. Examples of storage devices and memory modules are described below in conjunction with FIG. 1. In general, a host system can utilize a memory sub-system that includes one or more memory components, such as memory devices that store data. The host system can provide data to be stored at the memory sub-system and can request data to be retrieved from the memory sub-system.

A memory sub-system can utilize one or more memory devices, including any combination of the different types of non-volatile memory devices and/or volatile memory devices, to store the data provided by the host system. In some embodiments, non-volatile memory devices can be provided by negative-and (NAND) type flash memory devices. Other examples of non-volatile memory devices are described below in conjunction with FIG. 1. A non-volatile memory device is a package of one or more dice. Each die can include one or more planes. A plane is a portion of a memory device that includes multiple memory cells. Some memory devices can include two or more planes. For some types of non-volatile memory devices (e.g., NAND devices), each plane includes a set of physical blocks. Each block includes a set of pages. "Block" herein shall refer to a set of contiguous or non-contiguous memory pages. An example of a "block" is an "erasable block," which is the minimal erasable unit of memory, while "page" is a minimal writable unit of memory. Each page corresponds to a set of memory cells. A memory cell is an electronic circuit that stores information. In some instances, memory cells can be single level cells (SLCs) that are configured to store a single bit of data (e.g., a single data item, etc.). In other instances, memory cells can be configured to store multiple bits of data. For example, memory cells can be multi-level cells (MLCs), triple-level cells (TLCs), or quad-level cells (QLCs) (collectively referred to herein as XLCs or multiple level cells). Each memory cell type can have a different data density, which corresponds to an amount of data (e.g., bits of data, etc.) that can be stored per memory cell).

Data operations can be performed by the memory sub-system. The data operations can be host-initiated operations. For example, the host system can initiate a data operation (e.g., write, read, erase, etc.) on a memory sub-system. The host system can send access requests (e.g., a programming command, a read command, etc.) to the memory sub-system, such as to store data on a memory device at the memory sub-system and to read data from the memory device on the memory sub-system. The data to be read or written, as specified by a host request, is hereinafter referred to as "host data." A host request can include a logical address (e.g., a logical block address (LBA) and namespace) for the host data, which is the location that the host system associates with the host data. The logical address information (e.g., LBA, namespace) can be part of metadata for the host data. A host data item, as used herein, refers to a unit of host data (e.g., one or more bits of host data) that is associated with a respective logical address (e.g., as provided by the host system).

Characteristics of a memory device and/or memory cells at a memory device can impact whether a memory access operation is successfully performed at the memory device. For example, a cross temperature characteristic for memory cells of a memory device corresponds to a behavior of the memory cells based on a difference between a temperature of the memory device at a time period during which data was programmed to the memory cells and a temperature of the memory device at a time period during which a request to access (e.g., read) the data is received from a host system. A memory access operation (e.g., a read operation) performed at memory cells associated with a high cross temperature may be more likely to fail than a memory access operation performed at memory cells associated with a lower cross temperature. In another example, a bake time characteristic for memory cells corresponds to a behavior of the memory cells based on distance between a time period during which data was programed to the memory cells and a time period during which a request to access the data is received. A memory access operation performed at memory cells associated with a long bake time may be more likely to fail than a memory access operation performed at memory cells associated with a shorter bake time.

In some instances, a quality of a memory device can further impact the successful performance of a memory access operation at the memory device. For example, memory access operations performed at memory cells associated with particular characteristics (e.g., high cross temperature, long bake time, etc.) may be even more likely to fail if the memory cells reside at a low quality memory device (also referred to as a weak memory device). A quality of a memory device can depend on physical characteristics of the memory device, which can be impacted by the memory device fabrication process. For example, a memory device can be fabricated from a portion of a substrate (e.g., a silicon wafer, etc.). Factory conditions and/or substrate process conditions can impact a quality of substrates of a lot, and in some instances, a quality of various regions of an individual substrate. Accordingly, a quality of a memory device can be dependent on the quality of a particular substrate used to fabricate the memory device and/or a region of a substrate to which the memory device is fabricated (e.g., memory devices fabricated from a region of a substrate associated with a radius of R1 can be of higher quality than memory devices fabricated from a region of a substrate associated with a radius of R2). In another example, conditions of the memory device fabrication process can impact an overall structure of the memory device and, in some instances, a circuity at the memory device. Experiments and/or tests can be performed for memory devices before initialization at a memory sub-system (e.g., by an operator of the manufacturing system, a developer, etc.) to rate the quality of the memory device in view of the overall structure and/or circuitry of the memory devices. In some instances, the quality of the memory device can be rated in view of one or more probe metrics (e.g., a metric indicating an error rate of the device when data is freshly programmed, a metric indicating a read window budget for the memory device, etc.) that are determined based on the testing and/or experimentation.

After a memory access operation fails at a memory sub-system, a controller for the memory sub-system can initiate one or more error correction operations to attempt to access the data. In some instances, the one or more error correction operations can be included in a sequence of error correction operations, where each operation of the sequence increases in complexity and therefore overall latency. In an illustrative example, in response to detecting that a memory access operation has failed at a memory sub-system, the memory sub-system controller can execute an initial error correction operation of the sequence to attempt to access the data. The initial operation can include a first soft decode operation, which involves the memory sub-system controller performing read operations using first voltages adjacent to a target voltage to identify an optimal voltage associated with reading the data. A latency associated with the first soft decode operation can be approximately 125 microseconds ($\mu s$), in some instances. If the first soft decode operation fails and the memory sub-system controller is not able to access the data, the memory sub-system controller can execute a subsequent error correction operation of the sequence to attempt to access the data. In one example, a subsequent operation can include a second soft decode operation, which involves the memory sub-system controller performing read operations using second voltages (e.g., adjacent to the first voltages) to identify the optimal read voltage. A latency associated with a second soft decode operation can be approximately 150 $\mu s$, in some instances. If the second decode operation fails, the memory sub-system controller can execute additional soft decode operations, each increasing in overall latency. The memory sub-system controller can execute other types of error correction operations (e.g., RAID or RAIN operations), if the soft decode operations fail to access the data. A latency associated with the other types of error correction operations can be significantly long (e.g., 400 $\mu s$ or longer).

As indicated above, memory access operations performed to access data programmed to memory cells having particular characteristics and/or memory cells residing at weak memory devices can be more likely to fail. Accordingly, a memory sub-system controller can execute a significant number of error correction (e.g., soft decode, etc.) operations to access data after memory access operations at such memory cells fail. In some systems, a memory sub-system controller executes a memory access operation and at least one error correction operation for each request to access data programmed to memory cells having particular characteristics and/or residing at weak memory devices. In an illustrative example, a memory access operation can be associated with a latency of approximately 100 $\mu s$ and a first soft decode operation can be associated with a latency of approximately 125 $\mu s$. Accordingly, a latency associated with accessing such data of a request can be at least 225 $\mu s$. Since a memory sub-system controller frequently performs a memory access operation and at least one error correction operation at such memory cells, an overall latency associated with accessing data at the memory cells and/or at the memory device can be significantly highly. In addition, performance of both memory access operations and at least one error correction operation to access data can decrease an overall efficiency and an overall throughput of the memory sub-system.

Aspects of the present disclosure address the above and other deficiencies by providing techniques for accessing data using error correction operation(s) to reduce latency at a memory sub-system. A memory sub-system controller can receive a request (e.g., from a host system) to access data programmed to the memory sub-system. The memory sub-system controller can determine whether memory cells that store the data satisfy one or more cell degradation criteria (e.g., in view of one or more characteristics associated with the memory cells). The one or more cell degradation criteria can include one or more threshold values that correspond to characteristics of degraded memory cells that are likely to cause a failed memory access operation. The threshold values of the degradation criteria can be determined (e.g., by an operator, a developer, etc.) in view of experimental and/or test data for the memory sub-system, in some instances.

In at least one illustrative example, the cell degradation criteria can include a cross temperature threshold condition. The memory sub-system controller can determine a cross temperature associated with memory cells that stores the programmed data and can determine whether the memory cells satisfy the cell degradation criteria by determining whether the cross temperature exceeds a cross temperature threshold. The cell degradation criteria can additionally or alternatively include a time difference threshold condition. The memory sub-system controller can determine a distance between a time period at which data of the request was programmed to the memory cells and a time period at which the request was received (e.g., a bake time) and can determine whether the memory cells satisfy the cell degradation criteria by determining whether the distance between the first and second time period exceeds a time distance threshold. The cell degradation criteria can additionally or alternatively include an error rate threshold condition. The memory sub-system controller can determine whether the memory cells satisfy the cell degradation criteria by determining whether memory cells that store the data of the request are included in a set of memory cells (e.g., of a wordline, of a voltage bin, etc.) associated with an error rate that exceeds an error rate threshold. Further details regarding the cell degradation criteria and corresponding threshold conditions are provided in herein.

In some embodiments, the memory sub-system controller can further determine whether the memory cells reside at a weak memory device. A memory device can be characterized as a weak memory device in view a manufacturing process performed to fabricate the memory device. In some embodiments, the memory sub-system controller can determine whether the memory device that includes the memory cells is weak by determining whether the memory device satisfies a weak memory device criterion. A memory device can satisfy the weak memory device criterion if the memory device was formed from a substrate, or a region of a substrate, that is associated with a lower device quality rating than device quality ratings for other regions of the substrate, in some embodiments. In additional or alternative embodiments, the memory device can satisfy the weak memory device criterion if a value of one or more probe metrics associated with the memory device exceed a probe metric threshold. Further details regarding characterizing a memory device as a weak memory device are provided herein.

In response to determining that the memory cells satisfy the one or more cell degradation criteria (e.g., that characteristics of the memory cells exceed the one or more corresponding threshold values) and/or the memory cells reside at a weak memory device, the memory sub-system controller can determine that an error correction operation is to be performed to access the data of the request instead of a memory access operation (e.g., a read operation). In some embodiments, the memory sub-system controller can perform an initial error correction operation of a sequence of error correction operations to access the data. For example, the memory sub-system controller can perform a first soft decode operation to access the data (e.g., without first performing a read operation). If the first soft decode operation is not successful, the memory sub-system controller can perform subsequence error correction operations (e.g., a second soft decode operation, a third soft decode operation, and so forth) until the data can be accessed. In additional or alternative embodiments, the memory sub-system controller can select a particular error correction operation (e.g., of the sequence of error correction operations) to be performed to access the data in view of the characteristics of the memory cells and/or the memory device that includes the memory cells. For example, the memory sub-system controller can select a third error correction operation of the sequence of error correction operations (e.g., a third soft decode operation) to be performed to access the data in view of characteristics of the memory cells and/or the memory device that includes the memory cells. Further details regarding the above described embodiments are provided herein.

Advantages of the present disclosure include, but are not limited to, provide a mechanism to enable a memory sub-system controller to identify and perform an operation (e.g., a memory access operation, an error correction operation, etc.) that is likely to successfully access data at a memory sub-system in view of characteristics of memory cells that store the data and/or a memory device that includes the memory cells. Embodiments of the present disclosure enable the memory sub-system controller to consider characteristics of the memory cells and/or the memory device before performing a memory access of a request. If the memory sub-system controller determines that the memory cells satisfy a cell degradation criteria and/or the memory device is a weak memory device, the memory sub-system controller can perform an error correction operation to access the data of a request instead of performing a memory access operation that is likely to fail. Accordingly, an overall latency associated with accessing data at memory cells and/or a memory device having particular characteristics is significantly decreased. In an illustrative example, a memory access operation at a memory sub-system can be associated with a latency of approximately 100 µs and a soft decode operation can be associated with a latency of approximately 125 µs. If the memory sub-system controller determines that memory cells that store programmed data satisfy a cell degradation criterion and/or reside at a weak memory device, the memory sub-system controller can perform the soft decode operation to access the data and therefore a latency associated with the request is approximately 125 µs (e.g., as opposed to 225 µs if the memory access operation and the soft decode operation were performed). This decrease in overall latency is further realized if the memory sub-system controller selects subsequent operations of an error correction operation sequence to be performed to access the data. In addition, as fewer operations are performed at the memory sub-system, an overall efficiency and an overall throughput of the memory sub-system is increased.

Figure 1:
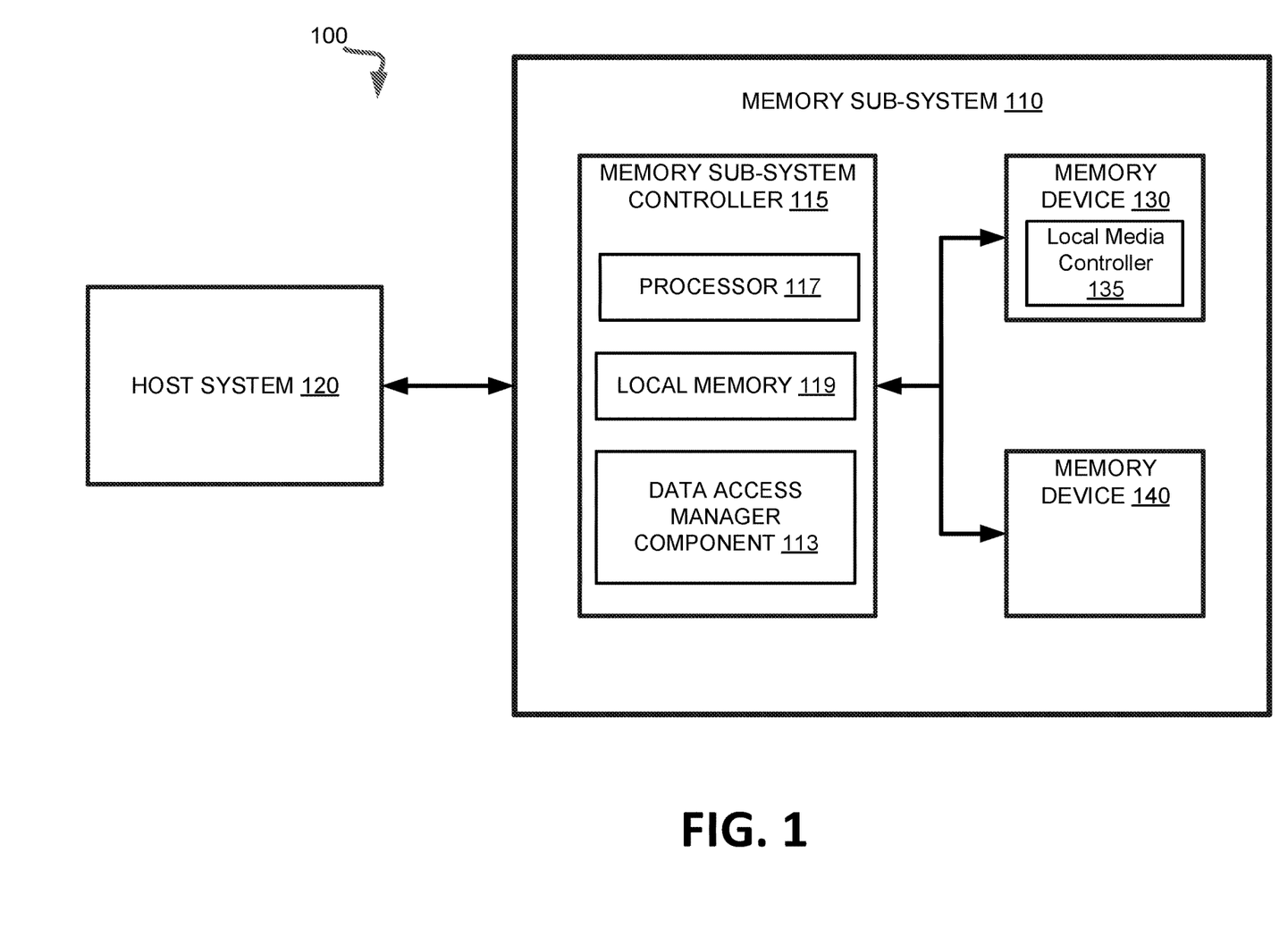
FIG. 1 illustrates an example computing system that includes a memory sub-system, in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DEV IM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

In one embodiment, the memory sub-system 110 includes a data access manager component 113 (referred to as data access manager 113) that can determine whether to perform a memory access operation (e.g., a read operation) or an error correction operation to access data programmed to memory cells of one or more memory devices 130, 140 of memory sub-system 110. In some embodiments, the memory sub-system controller 115 includes at least a portion of the data access manager component 113. For example, the memory sub-system controller 115 can include a processor 117 (processing device) configured to execute instructions stored in local memory 119 for performing the operations described herein. In some embodiments, the data access manager component 113 is part of the host system 120, an application, or an operating system.

In some embodiments, memory sub-system controller 115 can receive a request from host system 120 to access data programmed to memory cells of one or more memory devices 130, 140 of memory sub-system 110. In response to the request, data access manager 113 can, in some embodiments, determine whether memory cells that store the programmed data satisfy one or more cell degradation criteria. Data access manager 113 can determine whether the memory cells satisfy the one or more cell degradation criteria in view of one or more characteristics of the memory cells (e.g., a cross temperature, a bake time, etc.). In additional or alternative embodiments, data access manager 113 can determine whether a memory device 130, 140 that includes the memory cells satisfies a weak device criterion. In response to determining that the memory cells satisfy the one or more cell degradation criteria and/or the memory device 130, 140 satisfies the weak device criterion, data access manager 113 can perform an error correction operation to access the data in accordance with the received request. If the cell degradation criteria and/or the weak device criterion is not satisfied, data access manager 113 can perform a memory access operation (e.g., a read operation) to access the data in accordance with the received request. Further details regarding data access manager 113 and accessing data at memory cells of a memory device 130, 140 are provided herein.

Figure 2:
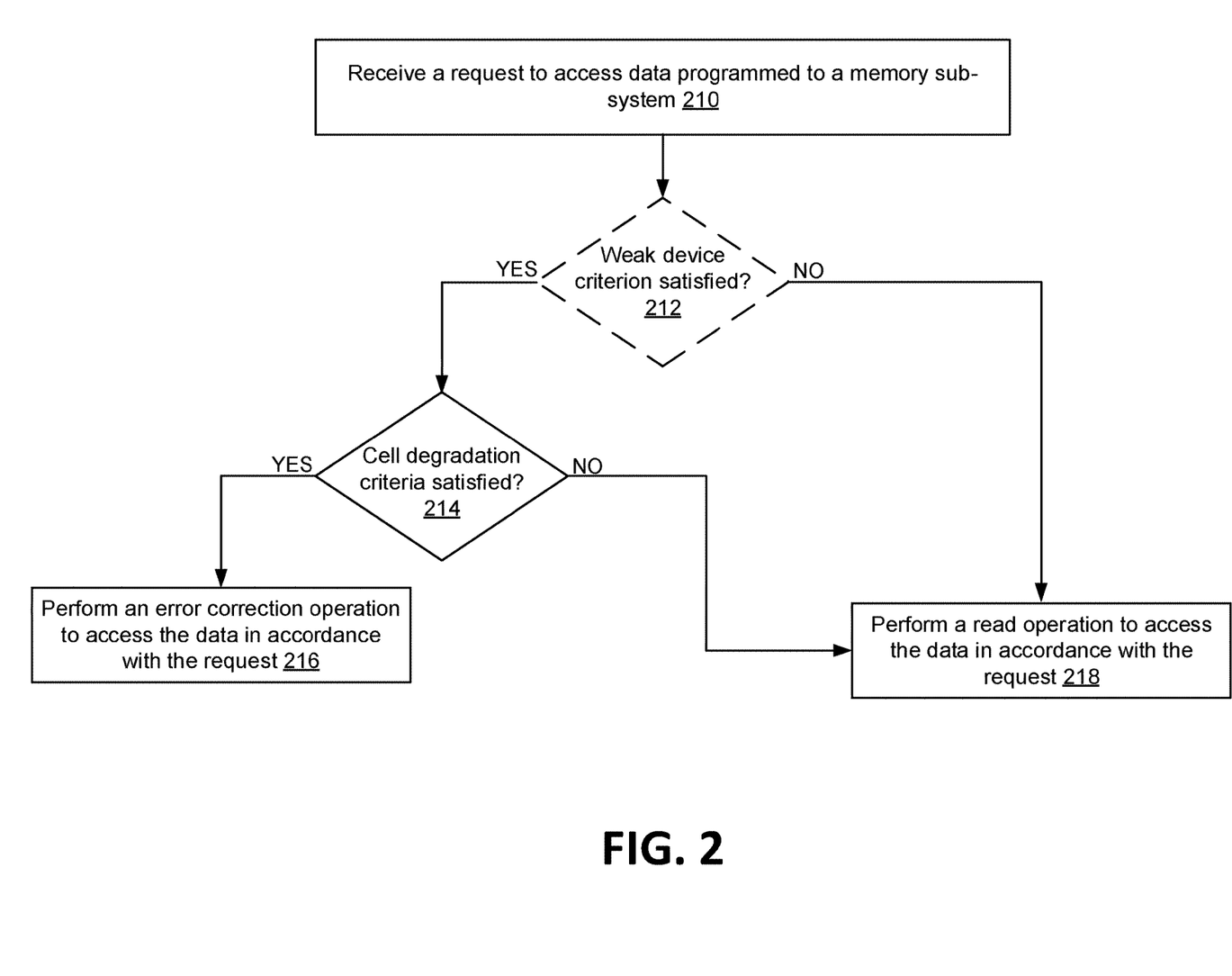
FIG. 2 is a flow diagram of an example method for accessing data using error correction operation(s) to reduce latency at a memory sub-system, in accordance with some embodiments of the present disclosure.

FIG. 2 is a flow diagram of an example method 200 for accessing data using error correction operation(s) to reduce latency at a memory sub-system. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, one or more operations of method 200 are performed by the memory sub-system controller 115 of FIG. 1. For example, one or more operations of method 200 can be performed by data access manager 113. One or more operations of method 200 is performed by another component of the memory sub-system controller 115, or by a component of local media controller 135, in additional or alternative embodiments. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 210, processing logic receives a request to access data programmed to a memory sub-system. In some embodiments, processing logic (e.g., memory sub-system controller 115 and/or data access manager 113) can receive the request from host system 120. The request can be a request to read data from memory cells at memory sub-system 110. In some embodiments, the request can include a memory address (e.g., a logical address, such as a logical block address) associated with the memory cells that stores the programmed data.

At block 212, processing logic, optionally, determines whether a memory device that includes memory cells that stores the programmed data satisfies a weak device criterion. As indicated above, a memory device (e.g., memory device 130, 140) can be characterized as a weak memory device in view of a fabrication process performed (e.g., at a manufacturing system, etc.) to form the memory device 130, 140. For example, a memory device can be fabricated from a portion of a substrate (e.g., a silicon wafer, etc.). Factory conditions and/or substrate process conditions can impact a quality of the substrate that is used to fabricate the memory device 130, 140, in some instances. In some embodiments, the factory conditions and/or the substrate conditions can cause regions of a single substrate to have different characteristics, and therefore have a different quality, than other regions of the substrate. In one illustrative example, a substrate can have a circular shape. Memory sub-system controller 115 (or another controller or system of memory sub-system 110 and/or separate from memory sub-system 110) can determine based on experimental and/or historical data that memory devices 130, 140 that are fabricated from a region of the substrate that is at or adjacent to the center of the substrate are of a different quality (e.g., a higher quality) than memory devices 130, 140 that are fabricated from a region of the substrate that is at or adjacent to an edge of the substrate. This difference in memory device quality 130, 140 can be caused based on conditions of the factory that manufactured and/or otherwise processed the substrate and/or conditions or settings of the substrate process performed for the substrate.

Data access manager 113 can determine a region of a substrate used to fabricate a memory device 130, 140 that includes memory cells storing the data of the request by converting a memory address (e.g., the LBA) associated with the memory cells to a substrate identifier (SID). The SID can indicate a lot at the substrate manufacturing system that included the substrate used to fabricate memory device 130, 140 and/or a coordinate (e.g., a Cartesian coordinate, etc.) for a region of the substrate that formed memory device 130, 140. In some embodiments, data access manager 113 can convert the memory address to the SID by providing the memory address as input to a SID conversion function. The SID conversion function can receive an indication of a memory address as input and provide an indication of a SID associated with the memory device 130, 140 that includes memory cells associated with the memory address as output. In one example, data access manager 113 can provide the logical address as input to the SID conversion function. In another example, data access manager 113 can determine a physical address associated with the logical address (e.g., using a logical-to-physical (L2P) table) and provide the physical address as input to the SID function to obtain the SID.

In additional or alternative embodiments, data access manager 113 can convert the memory address to the SID by accessing a memory address-to-SID data structure. The memory address-to-SID data structure can be maintained by memory sub-system controller 115 or another component at memory sub-system 110, in some embodiments. Each entry of the memory address-to-SID data structure can include a field indicating one or more memory address (e.g., a range of logical addresses, a range of physical addresses, etc.) and another field indicating an SID for a substrate that was used to form a memory device 130, 140 that includes memory cells associated with the one or more memory addresses. Data access manager 11 can convert the memory address to the SID by accessing the memory address-to-SID data structure, identifying an entry that corresponds to the memory address (e.g., a logical address, a physical address) for the memory cells that stores the programmed data, and extracting an SID from the identified entry. It should be noted that other techniques can be used to determine the SID or other information associated with a substrate that was used to fabricate memory device 130, 140, in accordance with embodiments of the present disclosure.

In some embodiments, the coordinates for the region of the substrate that formed memory device 130, 140 (as indicated by the SID) corresponds to a distance between a center of the substrate (or an edge of the substrate) and the region of the substrate that formed memory device 130, 140. As the substrate can have a circular shape, in some embodiments, the corresponding distance can be associated with a region along a radius of the substrate. In some embodiments, data access manager 113 can determine a region along the radius of the substrate corresponding to the coordinates of the SID. In an illustrative example, data access manager 113 (or another component of memory sub-system controller 115 or a processing device outside of memory sub-system 110) can determine the region along the radius that corresponds to the coordinates of the SID using the following equation:

$$\text{Radius} = \sqrt{\left(\frac{(X - X_{Center})}{X_{Range}} \times 100\right)^2 + \left(\frac{(Y - Y_{Center})}{Y_{Range}} \times 100\right)^2}$$

where X, Y correspond to coordinates (e.g., Cartesian coordinates) indicated by the SID, $X_{Center}$, $Y_{Center}$, correspond to coordinates (e.g., Cartesian coordinates) associated with a center region of the substrate, and $X_{Range}$, $Y_{Range}$ correspond to a range of coordinates (e.g., Cartesian coordinates) along a radius of the substrate. It should be noted that data access manager 113 can determine the region along the radius of the substrate corresponding to the coordinates of the SID according to other techniques, in accordance with embodiments of the present disclosure.

As indicated above, a quality of a memory device 130, 140 can be further indicated in view of values of probe metrics collected for the memory device 130, 140 (e.g., prior to installation or initialization of the memory device 130, 140 at memory sub-system 110). A probe metric can refer to a metric generated, calculated, or otherwise obtained for a memory device 130, 140 by performing one or more probe operations. In some instances, a probe operation can include an operation to determine an error rate for the memory device 130, 140 when data is freshly programmed, operation to determine a read window budget (e.g., an amount of voltage margin between two or more consecutive voltage levels between which a read voltage can be applied to successfully read data) for a memory device 130, 140, and so forth. In an illustrative example, probe metrics can be generated, calculated, or otherwise obtained for the memory device 130, 140 after fabrication of the memory device 130, 140 and before installation and/or initialization of the memory device 130, 140 at memory sub-system 110. In another illustrative example, memory device 130, 140 can be fabricated from a substrate included in a lot, as indicated above. Probe metrics can be obtained for other memory devices fabricated from the substrate or another substrate in the lot, in some embodiments. The obtained probe metrics can be associated with the memory device 130, 140, in some embodiments.

Figure 3:
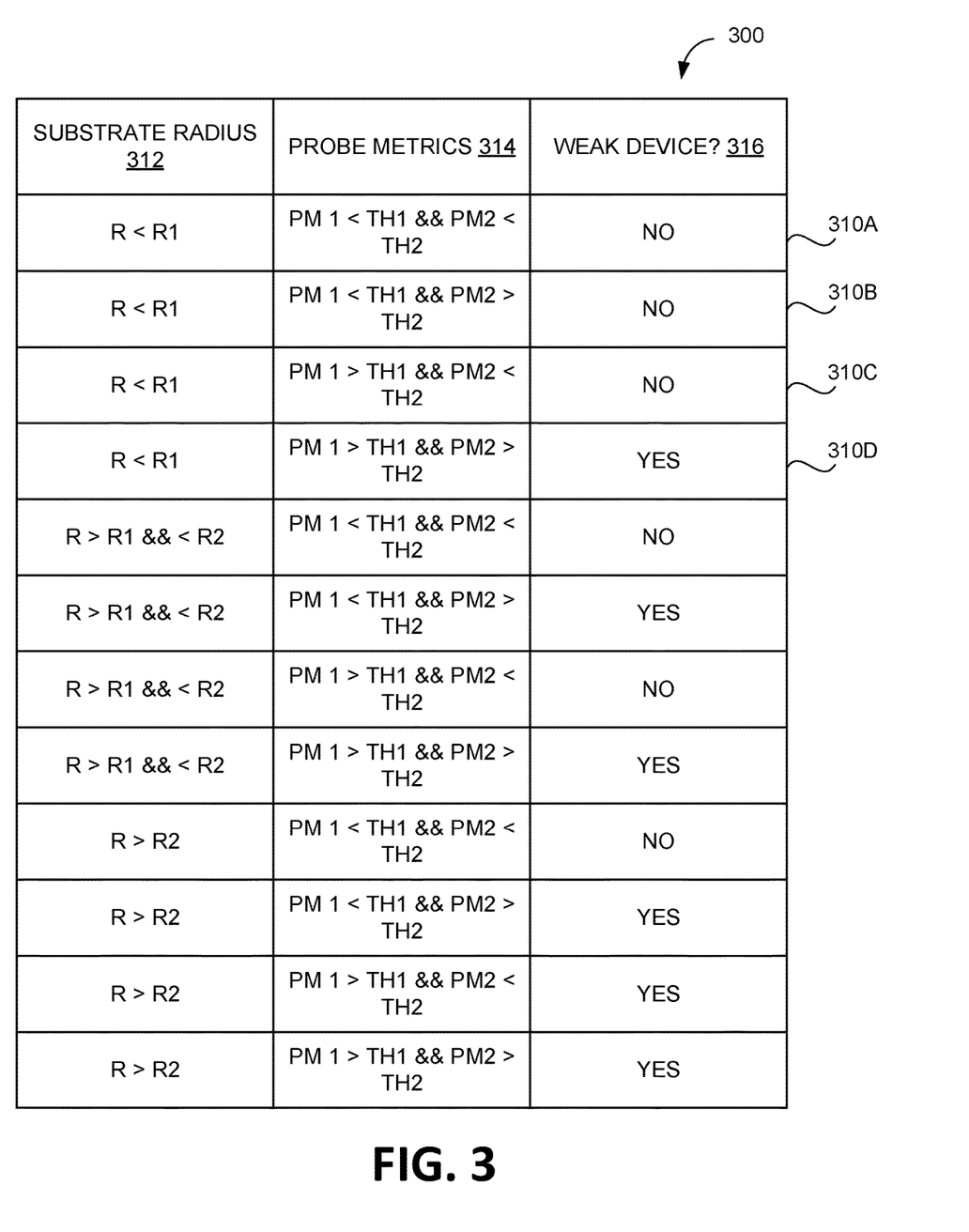
FIG. 3 depicts an example of data for determining whether a memory device satisfies a weak device criterion, in accordance with some embodiments of the present disclosure.

Data access manager 113 can determine whether the memory device 130, 140 that includes the memory cells that stores the data of the request satisfies the weak device criterion based on one or more of the region along the radius of the substrate that corresponds to the coordinates of the SID or the values of one or more probe metrics associated with the memory device 130, 140, in some embodiments. FIG. 3 depicts an example of data 300 for determining whether a memory device satisfies a weak device criterion, in accordance with some embodiments of the present disclosure. In some embodiments, one or more portions of data 300 can be included in a data structure (e.g., a table) that is maintained by or otherwise accessible to data access manager 113 and/or memory sub-system controller 115. In some embodiments, data 300 can be provided to memory sub-system 110 during initialization. For example, data 300 can be stored at local memory 119 (or at one or more regions of memory devices 130, 140) during initialization. Data 300 can be determined in view of experimental data and/or historical data associated with memory sub-system 110 and/or other memory sub-systems, in some embodiments.

As illustrated in FIG. 3, data 300 can be included in a data structure (e.g., a table) in some embodiments. Each entry 310 of the data structure can include a substrate radius field 312, a probe metrics field 314, and/or a weak device characterization field 316. The substrate radius field 312 can indicate one or more threshold conditions associated with regions along a radius of a substrate that corresponds to coordinates indicated by a SID, as described above. The probe metrics field 314 indicates one or more probe metric threshold conditions associated with probe metrics determined for memory devices 130, 140. The weak device characterization field 316 indicates whether a memory device 130, 140 is characterized as a weak device in view of the threshold conditions of the substrate radius field 312 and/or the probe metrics field 314.

In some embodiments, data access manager 113 can identify an entry 310 of the data structure including data 300 that corresponds to the characteristics of memory device 130, 140. For example, data access manager 113 can determine the region along the radius of the substrate that corresponds to the coordinates of the determined SID, as described above. Such region is depicted as "R" in FIG. 3. Data access manager 113 can identify one or more entries 310 of the data structure that correspond to the determined region. For example, data access manager 113 can determine that the region that corresponds to the SID coordinates has as a distance from a center of the substrate that is less than "R1." Accordingly, data access manager 113 can identify entries 310A-D as corresponding to the determined region.

Data access manager 113 can identify, from the identified entries 310A-D, which entry corresponds to the probe metrics for memory device 130, 140. In an illustrative example, a first probe metric threshold (i.e., "TH1") can correspond to a first type of probe metric for memory device 130, 140. A second probe metric threshold (i.e., "TH2") can correspond to a second type of probe metric for memory device 130, 140. Data access manager 113 can obtain a value of a first probe metric having the first type (i.e., "PM 1") and a value of a second probe metric having the second type (i.e., "PM 2") for memory device 130, 140. In some embodiments, data access manager 113 can obtain the values for the probe metrics by accessing a region of local memory 119 (or memory devices 130, 140) that stores such values. In other or similar embodiments, data access manager 113 can receive the values for the probe metrics (e.g., in response to transmitting a request) via a network. For example, data access manager 113 can receive the values after transmitting a request to a computing system associated with the manufacturing system that fabricated the memory device 130, 140.

Data access manager 113 can compare the values for the probe metrics to the probe metric thresholds indicated by probe metrics field 314 of entries 310A-D to determine which of entries 310A-D corresponds to memory device 130, 140. Responsive to determining an entry that corresponds to memory device 130, 140, data access manager 113 can determine whether memory device 130, 140 is characterized as a weak memory device in view of weak device characterization field 316 of the determined entry. In an illustrative example, data access manager 113 can determine that the value for the first probe metric falls below the first probe metric threshold and the value for the second probe metric falls below the second probe metric threshold. Accordingly, data access manager 113 can determine that entry 310A corresponds to the memory device 130, 140 and can determine that the memory device 130, 140 is not characterized as a weak memory device in view of the weak device characterization field 316 of entry 310A. In another illustrative example, data access manager 113 can determine that the value for the first probe metric exceeds the first probe metric threshold and the value for the second probe metric exceeds the second probe metric threshold. Accordingly, data access manager 113 can determine that entry 310D corresponds to the memory device 130, 140 and can determine that the memory device 130, 140 is characterized as a weak memory device in view of the weak device characterization field 316 of entry 310D.

It should be noted that embodiments described with respect to FIG. 3 are provided for purposes of example and illustration only and that other techniques can be used to determine whether memory device 130, 140 is characterized as a weak memory device. For example, data access manager 113 can provide an indication of a region along the radius of the substrate used to fabricate memory device 130, 140 and/or values of probe metrics associated with memory device 130, 140 as input to a function. The function can be configured to provide, as an output, an indication of whether a memory device is a weak memory device. Data access manager 113 can determine whether memory device 130, 140 is characterized as a weak memory device based on an output of the function.

In some instances, a characterization of whether a memory device 130, 140 is a weak memory device may not change over the lifetime of the memory device 130, 140. Accordingly, in some embodiments, data access manager 113 (or another component of memory sub-system controller 115) can determine whether each memory device 130, 140 is a weak memory device (e.g., during or before initialization of memory sub-system controller 115) and can store an indication of the determination at local memory 119 (or a region of memory devices 130, 140). Data access manager 113 can determine whether a memory device 130, 140 is a weak memory device based on the stored indication when a request to access data is received, in some embodiments. In additional or alternative embodiments, another component (e.g., running on another computing system separate from memory sub-system 110) can determine whether each memory device 130, 140 is characterized as a weak memory device and can transmit one or more indications of the determination to memory sub-system controller 115. The received indication(s) can be stored at local memory 119 and/or memory devices 130, 140, as described above.

Referring back to FIG. 2, processing logic (e.g., data access manager 113) can determine that the weak device criterion is satisfied by determining that the memory device 130, 140 is characterized as a weak memory device, as described with respect to FIG. 3. In response to processing logic determining that the weak die criterion is satisfied, method 200 proceeds to block 214. In response to processing logic determining that the weak die criterion is not satisfied, method 200 proceeds to block 218. Further details regarding block 218 are provided below. It should be noted that in some embodiments, processing logic may not consider whether memory device 130, 140 is characterized as a weak memory device. In such embodiments, method 200 may not perform operations associated with block 212 and may perform operations associated with block 214 after receiving the request associated with block 210.

At block 214, processing logic determines whether the memory cells that store the programmed data satisfy one or more cell degradation criteria. As indicated above, the cell degradation criteria can include one or more threshold conditions that correspond to characteristics of degraded memory cells that are likely to cause a failed memory access operation. In some embodiments, the cell degradation criteria can include a cross temperature threshold. Data access manager 113 can determine a cross temperature associated with the memory cells of memory device 130, 140 that store the data of the request and can determine whether the determined cross temperature exceeds the cross temperature threshold. As indicated above, a cross temperature refers to a difference between a temperature of a memory device 130, 140 during a period at which data was programmed to memory cells of the memory device 130, 140 and a temperature of the memory device 130, 140 during a period at which the request to access the data was received. In some embodiments, data access manager 113 can determine the cross temperature associated with the memory cells based on data stored at local memory 119 and/or at regions of memory devices 130, 140. Data access manager can determine that the one or more cell degradation criteria are satisfied in response to determining that the cross temperature associated with the memory cells exceeds the cross temperature threshold.

In additional or alternative embodiments, the cell degradation criteria can include a time distance threshold. Data access manager 113 can determine a distance between a time period at which data was programmed to the memory cells and a time period at which the request to access the data was received. As indicated above, the determined distance can be referred to as a "bake time." Data access manager 113 can determine the bake time associated with the memory cells based on data stored at local memory 119 and/or at regions of memory devices 130, 140, in some embodiments. Data access manager 113 can determine that the one or more cell degradation criteria are satisfied in response to determining that the bake time associated with the memory cells exceeds the cross temperature threshold, in some embodiments.

In yet additional or alternative embodiments, the cell degradation criteria can include an error rate threshold. Data access manager 113 can determine an error rate associated with accessing data at a set of memory cells (e.g., a wordline, a voltage bin, etc.) including the memory cells that stores the programmed data, in some embodiments. Data access manager 113 can determine the error rate by accessing data stored at local memory 119 and/or memory devices 130, 140, in some embodiments. In response to determining that the error rate associated with accessing the data at the set of memory cells exceeds the error rate threshold, data access manager 113 can determine that the one or more cell degradation criteria are satisfied, in some embodiments.

Figure 4:
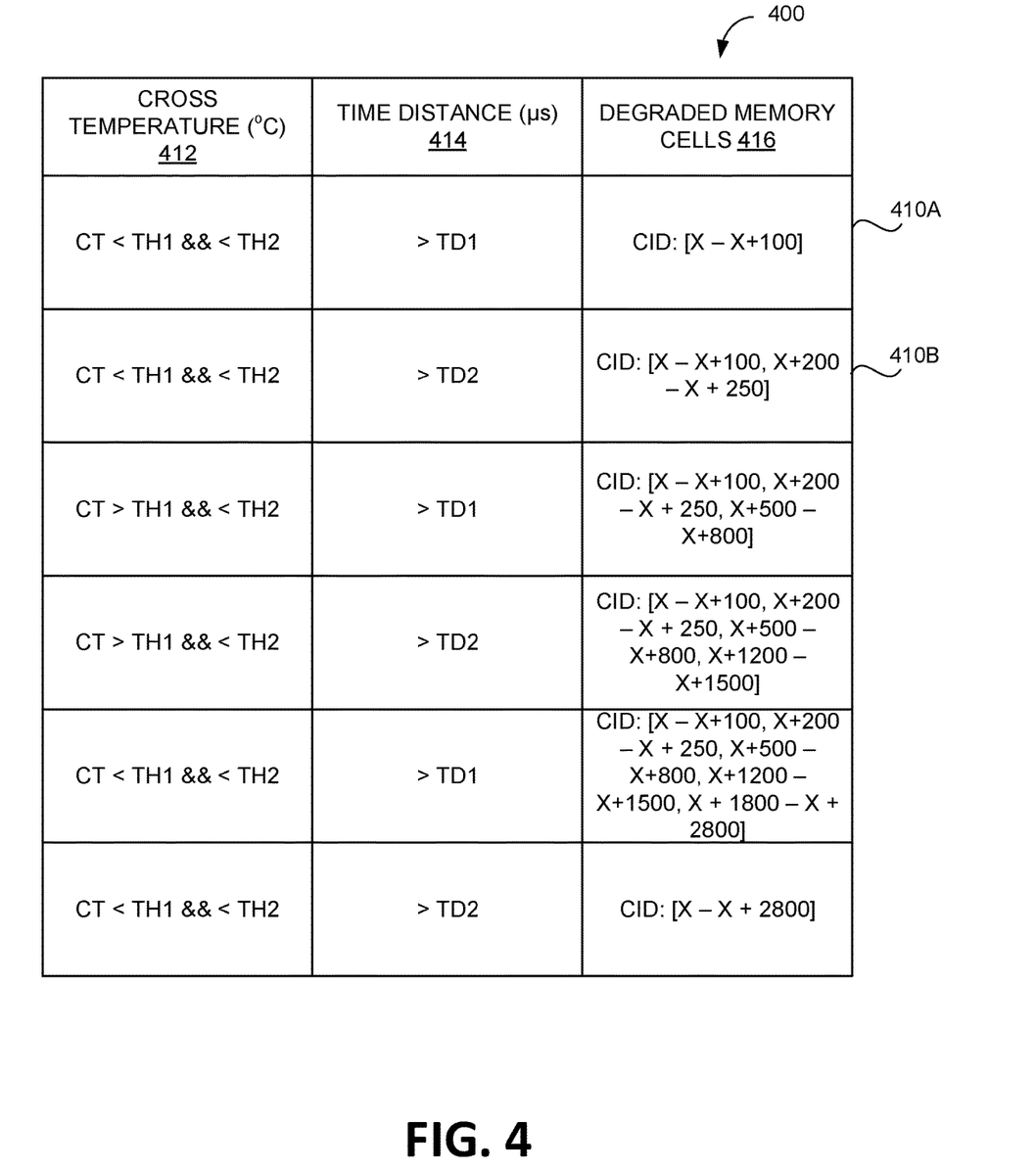
FIG. 4 depicts an example of data for determining whether memory cells satisfy one or more memory degradation criteria, in accordance with some embodiments of the present disclosure.

In some embodiments, data access manager 113 can consider each of the threshold conditions to determine whether the memory cells that store the data of the request satisfy the one or more cell degradation criteria. FIG. 4 depicts an example of data 400 for determining whether memory cells satisfy one or more memory degradation criteria, in accordance with some embodiments of the present disclosure. In some embodiments, one or more portions of data 400 can be included in a data structure (e.g., a table) that is maintained by or otherwise accessible by data access manager 113 and/or memory sub-system controller 115. In some embodiments, data 400 can be provided to memory sub-system 110 during initialization. For example, data 400 can be stored at local memory 119 (or at one or more regions of memory devices 130, 140) during initialization. Data 400 can be determined in view of experimental data and/or historical data associated with memory sub-system 110 and/or other memory sub-systems, in some embodiments.

As illustrated in FIG. 4, data 400 can be included in a data structure (e.g., a table) in some embodiments. Each entry 410 of the data structure can include a cross temperature difference field 412, a time distance field 414, and/or a degraded memory cells field 416. The cross temperature difference field 412 can indicate one or more cross temperature threshold conditions (e.g., depicted as "TH1" and "TH2" in FIG. 4) of the one or more cell degradation criteria. The time distance field 414 can indicate one or more time distance conditions or bake time conditions (e.g., depicted as "TD1" and "TD2" in FIG. 4). The degraded memory cells field 416 can indicate a range of memory cells (e.g., wordlines, one or more voltage bins, etc.) that are associated with error rates that exceed an error rate threshold of the cell degradation criteria in view of the threshold conditions indicated by the cross temperature difference field 412 and/or the time distance field 414. As illustrated in FIG. 4, degraded memory cells field 416 can indicate cell identifiers (OD) corresponding to a range of memory cells. In some embodiments, the CIDs can be memory addresses (e.g., a physical memory address, a logical memory address, etc.). In some embodiments, a range of memory cells indicated by degraded memory cells field 416 can be updated (e.g., by memory sub-system controller 115, etc.) during a runtime of memory sub-system 110.

Data access manager 113 can identify an entry 410 of the data structure including data 400 that corresponds to the characteristics of the memory cells that stores the data of the request. For example, data access manager 113 can determine a cross temperature associated with the memory cells, as described above. Data access manager 113 can compare the determined cross temperature to the cross temperature field 412 of each entry 410 to determine a field that corresponds to the memory cells. For example, data access manager 113 can determine that the cross temperature for the memory cells falls below a first cross temperate threshold (e.g., "TH1") and a second cross temperature threshold (e.g., "TH2"). Accordingly, data access manager can determine that entries 410A and 410B correspond to the memory cells.

Data access manager 113 can identify, from the determined entries 410A-B, which entry corresponds to the time distance (e.g., bake time) associated with the memory cells. In an illustrative example, data access manager 113 can determine that the bake time associated with the memory cells exceeds "TD1" but falls below "TD2." Accordingly, data access manager 113 can determine that entry 410A corresponds to the time distance associated with the memory cells.

As indicated above, degraded memory cells field 416 can indicate a range of memory cells that are associated with error rates that exceed an error rate threshold. Data access manager 113 can determine the range of memory cells indicated by the degraded memory cells field 416 of entry 410A and can determine whether the memory cells that stores the data of the request is included in the range of memory cells. In response to determining that the memory cells is included in the range of memory cells indicated by the degraded memory cells field 416 of entry 410A, data access manager 113 can determine that the one or more cell degradation criteria are satisfied.

It should be noted that data access manager 113 can determine whether memory cells satisfy the cell degradation criteria in accordance with other techniques. For example, data access manager 113 can provide an indication of a cross temperature of the memory cells, a bake time of the memory cells, and/or an identifier for a range of memory cells (e.g., a wordline, a voltage bin, etc.) that includes the memory cells as input to a function. The function can be configured to provide, in view of the given input data, an indication of whether cell degradation criteria is satisfied as an output. Data access manager 113 can determine whether the cell degradation criteria are satisfied based on the output of the function, in some embodiments.

In yet other or similar embodiments, data access manager 113 can provide an indication of a cross temperature of the memory cells, a bake time of the memory cells, and/or an identifier for a range of memory cells (e.g., a wordline, a voltage bin, etc.) that includes the memory cells as input to a machine learning model. The machine learning model can be trained, using experimental and/or historical data, to predict, based on given input data, a likelihood that memory cells satisfy the cell degradation criteria. Data access manager 113 can obtain one or more outputs of the machine learning model and can determine whether the memory cells satisfy the cell degradation criteria in view of the one or more obtained outputs.

Referring back to FIG. 2, in response to processing logic determining that the one or more cell degradation criteria are satisfied, method 200 proceeds to block 216. At block 216, processing logic performs an error correction operation to access the data in accordance with the request. In some embodiments, processing logic (e.g., data access manager 113) performs an initial error correction operation of a sequence of error correction operations. The initial error correction operation can be associated with a shorter latency time than subsequent error correction operations of the sequence. In an illustrative example, data access manager 113 (or another component of memory sub-system controller 115) can perform a first soft decode operation to access the data in accordance with the request. The first soft decode operation can be associated with a latency of 125 µs. If the first soft decode operation is successful, the memory sub-system controller 115 can access the data and can provide the data to the host system 120, in accordance with the request. If the first soft decode operation is unsuccessful, data access manager 113 (or the other component of memory sub-system controller 115) can perform a second soft decode operation to access the data. The second soft decode operation can be associated with a latency of 150 µs. Data access manager 113 (or the other component of memory sub-system controller 115) can perform additional error correction operations of the sequence (e.g., each increasing in complexity and therefore latency) until the data is successfully accessed at the memory cells.

In additional or alternative embodiments, data access manager 113 can select an error correction operation from the sequence of error correction operations to be performed to access the data of the request. Further details regarding such embodiments are provided with respect to FIG. 5.

In response to processing logic determining, at block 214, that the one or more cell degradation criteria are not satisfied (and/or at block 212 that the weak device criterion is not satisfied), method 200 proceeds to block 218. At block 218, processing logic can perform a read operation to access the data in accordance with the request. Processing logic (e.g., data access manager 113 and/or memory sub-system controller 115) can provide the accessed data to the host system in accordance with the request, in some embodiments.

Figure 5:
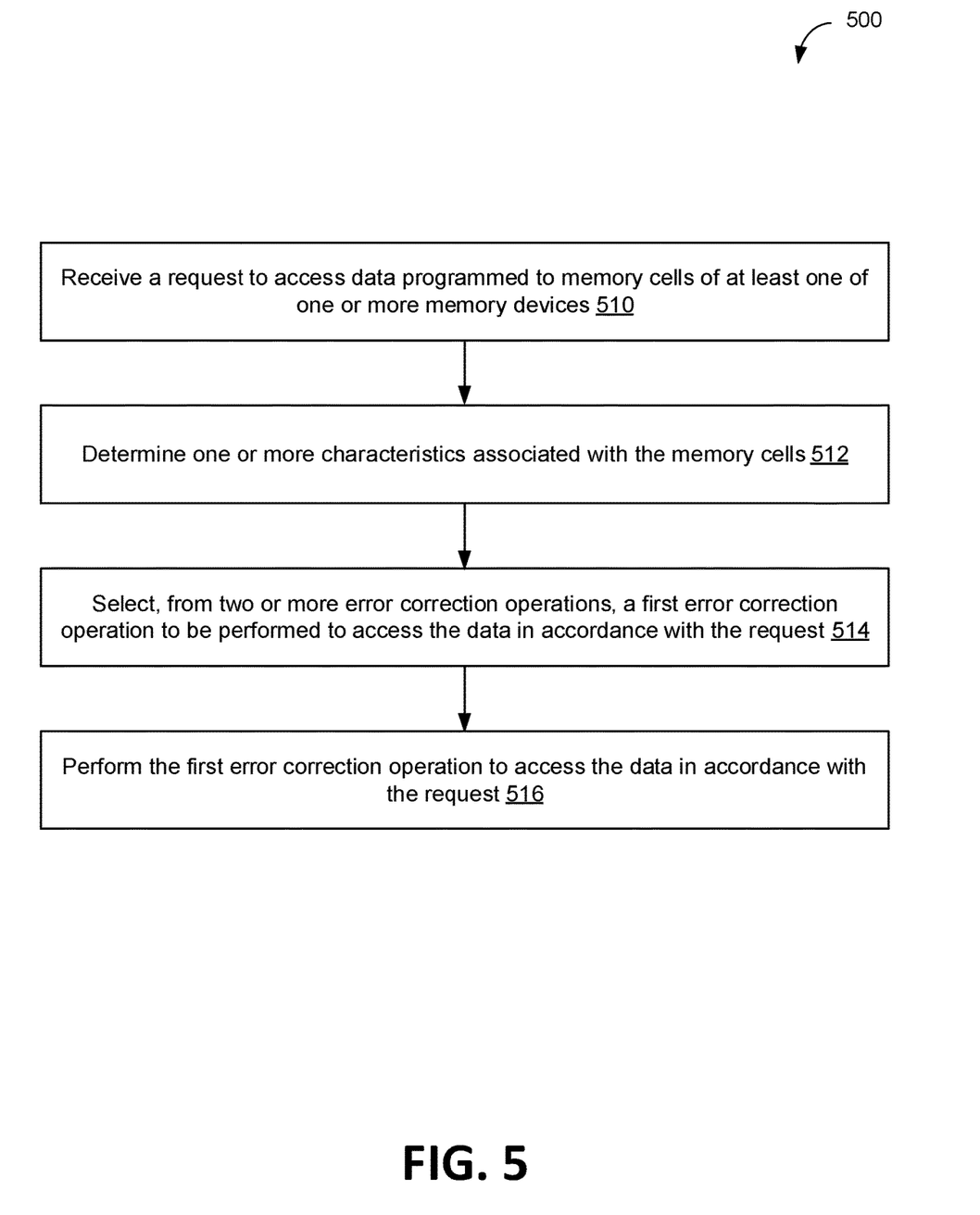
FIG. 5 is a flow diagram of another example method for accessing data using error correction operation(s) to reduce latency at a memory sub-system, in accordance with some embodiments of the present disclosure.

FIG. 5 is a flow diagram of another example method 500 for accessing data using error correction operation(s) to reduce latency at a memory sub-system, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, one or more operations of method 500 are performed by the memory sub-system controller 115 of FIG. 1. For example, one or more operations of method 500 can be performed by data access manager 113. One or more operations of method 500 can be performed by another component of the memory sub-system controller 115, or by a component of local media controller 135, in additional or alternative embodiments. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 510, processing logic receives a request to access data programmed to memory cells of at least one of one or more memory devices. The received request can correspond to the request described with respect to FIG. 2. At block 512, processing logic can determine one or more characteristics associated with memory cells that store the programmed data. The one or more characteristics can include one or more of a cross temperature associated with the memory cells, a bake time of the memory cells, and/or whether the memory cells are included in a set of memory cells (e.g., of a wordline, of a voltage bin, etc.) that is associated with an error rate that falls below an error rate threshold, as described above. Processing logic (e.g., data access manager 113) can determine the one or more characteristics associated with the memory cells by accessing data stored at local memory 119 and/or at regions of memory devices 130, 140.

At block 514, processing logic can select, from two or more error correction operations, a first error correction operation to be performed to access the data in accordance with the request. In some embodiments, processing logic can select the first error correction operation in view of the one or more characteristics associated with the memory cells. In accordance with previously described embodiments, processing logic (e.g., data access manager 113) can determine whether the memory cells satisfy one or more cell degradation criteria in view of the determined on or more characteristics. In response to determining that the memory cells satisfy the cell degradation criteria, data access manager 113 can determine that an error correction operation is to be performed to access the data of the request instead of a memory access operation (e.g., a read operation). Data access manager 113 can determine that the error correction operation is to be performed in response to determining that the memory device 130, 140 that includes the memory cells satisfies a weak device criterion, as described above.

In some embodiments, the first error correction operation can be selected from a sequence of error correction operations, as described above. Data access manager 113 can select a particular error correction operation that is to be performed in view a distance between a value of a characteristic associated with the memory cells and a threshold condition of the cell degradation criteria, in some embodiments. In an illustrative example, data access manager 113 can determine that a distance between a cross temperature of the memory cells and a threshold condition of the cell degradation criteria exceeds a first distance threshold but falls below a second distance threshold. In such example, data access manager 113 can select an initial error correction operation of the sequence of error correction operations (e.g. a first soft decode operation) to be performed to access the data. In another illustrative example, data access manager 113 can determine that the distance between the cross temperature of the memory cells and the threshold condition exceeds the second distance threshold. In such example, data access manager 113 can select a subsequent error correction operation of the sequence (e.g., a second soft decode operation, a third soft decode operation, etc.) to be performed to access the data.

In other or similar embodiments, data access manager 113 can select the error correction operation in view of data 300 and/or data 400. In an illustrative example, each entry of data 300 and/or data 400 can include an indication of a particular error correction operation that is to be performed in view of the characteristics of the memory device 130, 140 and/or memory cells that stores the data (e.g., indicated by fields 312, 314, 316, 412, 414, and/or 416). Data access manager 113 can identify an entry of data 300 and/or data 400 that corresponds to the memory device 130, 140 and/or memory cells that stores the data of the request and can extract from the identified entry an error correction operation that is to be performed.

At block 516, processing logic performs the first error correction operation to access the data in accordance with the request, in accordance with previously described embodiments. If the first error correction is not successful, processing logic can perform a subsequent error correction of the sequence of error correction operations, in some embodiments.

Figure 6:
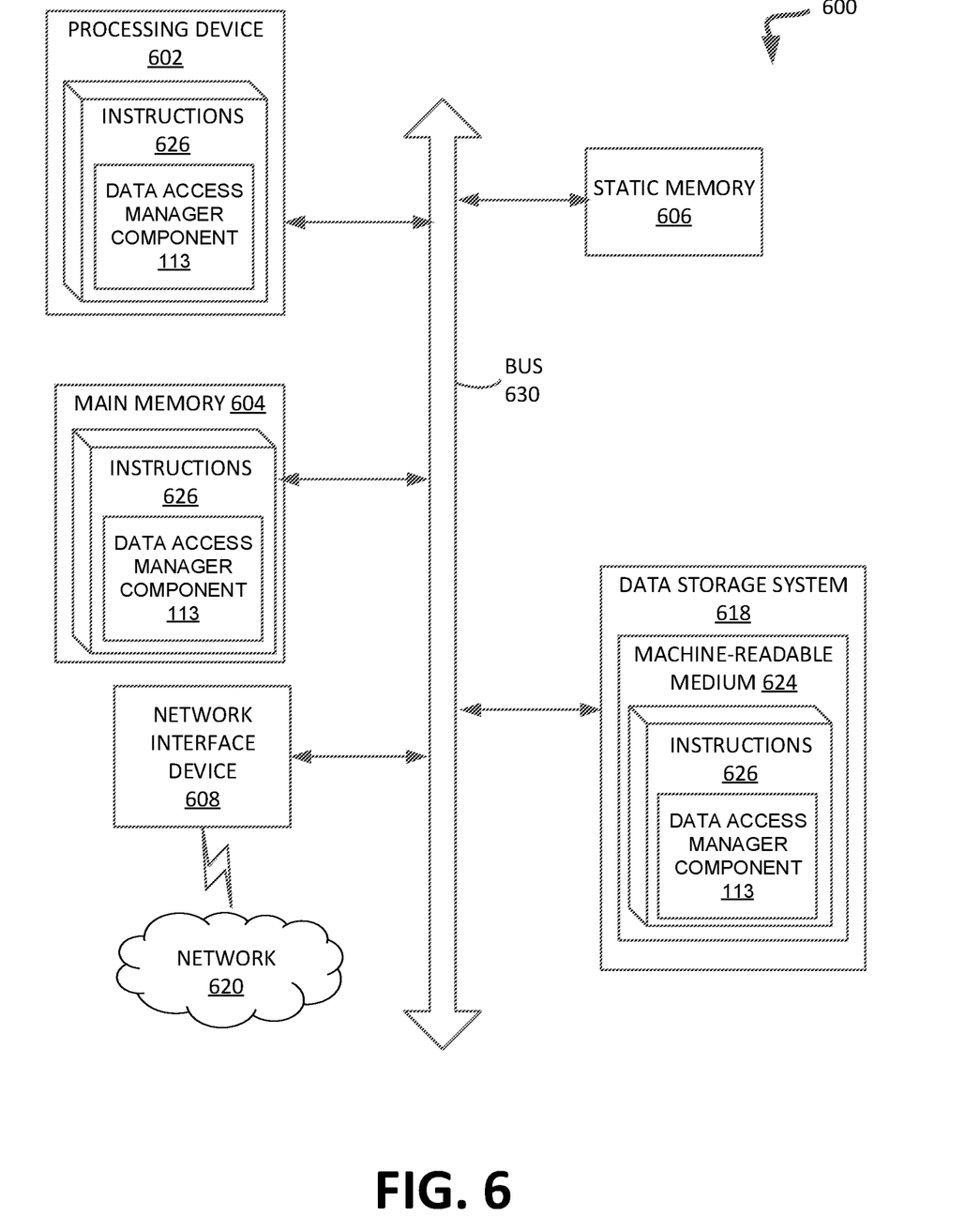
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the data access manager component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to memory sub-system 110 of FIG. 1.

In one embodiment, the instructions 626 include instructions to implement functionality corresponding to a voltage bin boundary component (e.g., the data access manager component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
    receiving a request to access data programmed to a memory sub-system, wherein the data was programmed to the memory sub-system at a first time period and the request is received at a second time period;
    determining whether memory cells of the memory sub-system that store the programmed data satisfy one or more cell degradation criteria at least by determining whether a distance between the first time period and the second time period exceeds a time distance threshold; and
    responsive to determining that the memory cells satisfy the one or more cell degradation criteria, performing an error correction operation to access the data in accordance with the received request.

2. The method of claim 1, further comprising:
    responsive to determining that the memory cells do not satisfy the one or more cell degradation criteria, performing a read operation to access the data in accordance with the received request.

3. The method of claim 1, wherein determining that the memory cells that store the programmed data satisfy the one or more cell degradation criteria further comprises:
    determining that a cross temperature associated with the programmed data exceeds a cross temperature threshold, wherein the cross temperature corresponds to a difference between a first temperature of the memory sub-system during a first time period at which the data was programmed to the memory sub-system and a second temperature of the memory sub-system during a second time period at which the request to access the data is received.

4. The method of claim 1, wherein determining that the memory cells that store the programmed data satisfy the one or more cell degradation criteria further comprises:
    determining that the memory cells is included in a set of memory cells associated with an error rate that exceeds an error rate threshold.

5. The method of claim 1, further comprising
    determining whether a memory device of the memory sub-system that includes the memory cells satisfies a weak memory device criterion, wherein the error correction operation is performed to access the data further responsive to determining that the memory device satisfies the weak memory device criterion.

6. The method of claim 5, wherein determining that the memory device of the memory sub-system that includes the memory cells satisfies a weak memory device criterion comprises:
    determining that a region of a substrate that included the memory device is associated with a lower device quality rating than device quality ratings for other regions of the substrate; and
    determining that a value of one or more probe metrics associated with the memory device exceed a probe metric threshold.

7. The method of claim 1, wherein the error correction operation comprises at least one of a soft decode operation or a corrective read operation.

8. The method of claim 1, wherein the memory cells correspond to at least one of one or more memory pages or one or more blocks at the memory sub-system.

9. A system comprising:
    one or more memory devices; and
    a processing device coupled to the one or more memory devices, wherein the processing device is to perform operations comprising:
        receiving a request to access data programmed to memory cells of at least one of the one or more memory devices;
        determining one or more characteristics associated with the memory cells wherein the one or more characteristics comprise a difference between a first time period at which the data was programmed to the at least one of the one or more memory devices and a second time period at which the request to access the data was received;
        selecting, from a plurality of error correction operations, a first error correction operation to be performed to access the data in accordance with the request, wherein the first error correction operation is selected in view of the determined one or more characteristics; and
        performing the first error correction operation to access the data in accordance with the request.

10. The system of claim 9, wherein selecting the first error correction operation to be performed to access the data in accordance with the request comprises:
- determining whether the one or more characteristics of the memory cells satisfy a first cell degradation criterion or a second cell degradation criterion, wherein the first cell degradation criterion is associated with a first threshold condition that is lower than a second threshold condition associated with the second cell degradation criterion,
- wherein the first error correction operation is selected to be performed to access the data responsive to determining that the first cell degradation criterion is satisfied based on at least one of the one or more characteristics of the memory cells exceeding the first threshold condition and falling below the second threshold condition of the second cell degradation criterion.

11. The system of claim 10, further comprising:
- responsive to determining that second cell degradation condition is satisfied based on the at least one of the one or more characteristics of the memory cells exceeding the second threshold condition, selecting a second error correction operation of the plurality of error correction operations to be performed to access the data, wherein the second error correction operation is associated with a latency period that is longer than a latency period for the first error correction operation.

12. The system of claim 10, wherein the one or more characteristics further comprise a cross temperature associated with the data programmed to the memory cells, the first threshold condition corresponds to a first cross temperature threshold, and the second threshold condition corresponds to a second cross temperature threshold.

13. The system of claim 10, wherein the first threshold condition corresponds to a first time difference threshold, and the second threshold condition corresponds to a second time difference threshold.

14. The system of claim 10, wherein the one or more characteristics further comprise an error rate associated with accessing data at the memory cells, the first threshold condition corresponds to a first error rate threshold, and the second threshold condition corresponds to a second error rate threshold.

15. The system of claim 9, further comprising:
- determining whether the at least one of the one or more memory devices that includes the memory cells satisfies a weak memory device criterion, wherein the first error correction is selected to be performed to access the data in accordance with the request in response to determining that the at least one of the one or more memory devices satisfies the weak memory device criterion.

16. The system of claim 15, wherein determining that the at least one of the one or more memory devices satisfies a weak memory device criterion comprises:
- determining that a region of a substrate that included the at least one of the one or more memory devices is associated with a lower device quality rating than device quality ratings for other regions of the substrate; and
- determining that a value of one or more probe metrics associated with the at least one of the one or more memory devices exceed a probe metric threshold.

17. The system of claim 9, wherein the plurality of error correction operations comprises at least one of a soft decode operation or a corrective read operation.

18. A non-transitory computer-readable storage medium comprising instructions that, when executed by a processing device, cause the processing device to perform operations comprising:
- receiving a request to access data programmed to a memory sub-system, wherein the data was programmed to the memory sub-system at a first time period and the request is received at a second time period;
- determining whether memory cells of the memory sub-system that store the programmed data satisfy one or more cell degradation criteria at least by determining whether a distance between the first time period and the second time period exceeds a time distance threshold; and
- responsive to determining that the memory cells satisfy the one or more cell degradation criteria, performing an error correction operation to access the data in accordance with the received request.

19. The non-transitory computer-readable storage medium of claim 18, wherein the operations further comprise:
- responsive to determining that the memory cells do not satisfy the one or more cell degradation criteria, performing a read operation to access the data in accordance with the received request.

* * * * *